(12) United States Patent
Harma

(10) Patent No.: US 8,731,940 B2
(45) Date of Patent: May 20, 2014

(54) METHOD OF CONTROLLING A SYSTEM AND SIGNAL PROCESSING SYSTEM

(75) Inventor: Aki Sakari Harma, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 368 days.

(21) Appl. No.: 13/119,597

(22) PCT Filed: Sep. 11, 2009

(86) PCT No.: PCT/IB2009/053981
§ 371 (c)(1),
(2), (4) Date: Mar. 17, 2010

(87) PCT Pub. No.: WO2010/032182
PCT Pub. Date: Mar. 25, 2010

(65) Prior Publication Data
US 2011/0191109 A1    Aug. 4, 2011

(30) Foreign Application Priority Data

Sep. 18, 2008 (EP) .................................. 08164557

(51) Int. Cl.
*G10L 21/00* (2013.01)
(52) U.S. Cl.
USPC ............................ 704/275; 704/246; 704/249
(58) Field of Classification Search
USPC ......... 704/231, 235, 243–246, 206, 270, 272, 704/270.1, 247, 249, 250, 275
See application file for complete search history.

(56) References Cited

U.S. PATENT DOCUMENTS

| | | | |
|---|---|---|---|
| 6,219,645 B1 | 4/2001 | Byers | |
| 6,424,946 B1 * | 7/2002 | Tritschler et al. | 704/272 |
| 6,574,592 B1 * | 6/2003 | Nankawa et al. | 704/206 |
| 6,996,526 B2 * | 2/2006 | Basson et al. | 704/231 |
| 7,496,510 B2 * | 2/2009 | Frank et al. | 704/246 |
| 2003/0210770 A1 | 11/2003 | Krejcarek | |
| 2005/0213723 A1 | 9/2005 | Chung | |
| 2005/0251386 A1 | 11/2005 | Kuris | |
| 2006/0193460 A1 | 8/2006 | Cadiz et al. | |
| 2006/0206329 A1 | 9/2006 | Attwater et al. | |

FOREIGN PATENT DOCUMENTS

| | | |
|---|---|---|
| EP | 1168885 A2 | 1/2002 |
| EP | 1526706 A2 | 4/2005 |
| WO | 2007086042 A2 | 8/2007 |

OTHER PUBLICATIONS

Davis et al: "Statistical Voice Activity Detection Using Low-Variance Spectrum Estimation and an Adaptive Threshold"; IEEE Transactions on Audio, Speech, and Language Processing, March 2006, Vol. 14, No. 2, pp. 412-424.

Brdiczka et al: "Automatic Detection of Interaction Groups"; Proc. ICMI, October 2005, 5 Page Document.

(Continued)

*Primary Examiner* — Huyen X. Vo

(57) ABSTRACT

A method of controlling a system which includes the steps of obtaining at least one signal representative of information communicated by a user via an input device in an environment of the user, wherein a signal from a first source is available in a perceptible form in the environment; estimating at least a point in time when a transition between information flowing from the first source and information flowing from the user is expected to occur; and timing the performance of a function by the system in relation to the estimated time.

13 Claims, 4 Drawing Sheets

(56) References Cited

OTHER PUBLICATIONS

Bou-Ghazale et al: "A Robust Endpoint Detection of Speech for Noisy Environments With Application to Automatic Speech Recognition"; Proceedings ICASSP, 2002, pp. IV-3908-IV-3811.

Huang et al: "A Novel Apaproach to Robust Speech Detection in Car Environments"; IEEE Int. Conference on Acoustics, Speech and Signal Processing, 2000, Vol. 3(5-9), pp. 1751-1754.

Harma, A.: "Ambient Telephony: Scenarios and Research Challenges"; Proceedings Interspeech, August 2007, 4 Page Document.

\* cited by examiner

METHOD OF CONTROLLING A SYSTEM AND SIGNAL PROCESSING SYSTEM

FIELD OF THE INVENTION

The invention relates to a method of controlling a system, including obtaining at least one signal representative of information communicated by a user via an input device in an environment of the user. The invention also relates to a signal processing system, including an interface to at least one input device in an environment of a user. The invention also relates to a computer program.

BACKGROUND OF THE INVENTION

Brdiczka, O. et al. "Automatic detection of interaction groups", *Proc. ICMI*, Oct. 4-6, 2005 discloses an approach for detecting interaction group configurations based on the assumption that conversational turn-taking is synchronized inside groups. The detector is based on a Hidden Markov Model (HMM) constructed upon conversational hypotheses. The input of the detector is a speech activity vector containing the information which individual is speaking or not. The synchronization of speech contributions within a group enables the detection of possible group configurations by an HMM built upon conversational hypotheses.

A problem of the known system is that it is not suitable for controlling the operation of a device. The detection of a change in group configuration occurs after the fact, and such detection is of only limited use as an input on which to base a control stratagem. Its primary use is to update contact lists of users.

SUMMARY OF THE INVENTION

It is desirable to provide a method, system and computer program of the types mentioned above which are suitable for controlling devices in a way that is unobtrusive for the user and appropriate to the activities of the user.

This is achieved by the method according to the invention, which includes:

obtaining at least one signal representative of information communicated by a user via an input device in an environment of the user, wherein a signal from a first source is available in a perceptible form in the environment;

estimating at least a point in time when a transition between information flowing from the first source and information flowing from the user is expected to occur; and timing the performance of a function by the system in relation to the predicted time.

The method allows a system in the environment of the user to provide functionality appropriate to different phases of interaction between a user and the system. In particular, certain functions may be performed when a user is contributing to a conversation-like interaction, and certain ones in the intervals between such contribution phases. Because the transitions between flows of information from source to user and user to source occur relatively frequently, the method is more suitable for continuous control of the functionality of the system. Because the transition is estimated, it is suitable for controlling a system during the conversation-like interaction, and not limited to execution after such interaction has ceased. Because the method takes its cue from responses of the user to the information from the first source, rather than explicit user input, it is unobtrusive. It is observed that the timing of a function relates to at least one of whether the function is performed at all or when it is performed with certain settings. In the latter cases, "timing" refers to the transitions between different settings.

An embodiment includes obtaining the signal from the first source and carrying out the estimation by analyzing the flow of information from the user and the flow of information carried in the signal from the first source in relation to each other on the basis of a model of conversational turn-taking.

Conversation-like interactions are structured in a predictable manner, basically comprising periods of alternating activity and silence which are synchronized between the flows of information. By analyzing the flow of information from the user and the flow of information carried in the signal from the first source in relation to each other on the basis of a model of conversational turn-taking, the initiation of a performance of a function by the system can also be synchronized. This can be done on the basis of a relatively short interval of past interaction.

In an embodiment, wherein the signals from the at least one input device and from the first source include at least an audio component, the method includes analyzing flows of audio information over time in relation to each other.

In contrast to e.g. video information, audio information above a certain threshold volume will come in bursts corresponding to the sources' contribution to a conversation. This makes it relatively easy to determine the existence of a conversation-like interaction between sources of two or more audio signals. Speech recognition is not required, whereas the determination of a conversation-like interaction on the basis of video information would generally require image analysis for detecting conversation-like interaction. The analysis of an audiovisual signal is, it is noted, not precluded in this embodiment. Compared to text messages, audio information is more amenable to analysis to detect interactions of a type corresponding to conversational turn-taking. Text messages would generally also require at least analysis of the subject headings to determine whether they relate to a particular discussion, e.g. one hosted on an electronic forum. It is generally difficult to detect conversations on the basis of only the temporal flow of postings to such a forum.

In a variant of this embodiment, the analysis of the flows of information includes applying a voice activity algorithm to the at least one signal representative of information communicated by the user.

An effect is that the subsequent analysis to determine the existence of conversation-like interactions can be much simpler. This subsequent analysis can be based on data indicating for each of a plurality of successive time intervals whether, or the likelihood that, that interval contains a contribution to a conversation-like interaction from a particular participant in the interaction.

In an embodiment, the signal from the first source is obtained via at least one telecommunications network from a remote telecommunication terminal having an open connection to a telecommunications system including an interface to at least the input devices in the environment of the user.

The application of the method to mediated forms of communication is relatively easy. In particular, it is already clear that the signal from the first source carries information from another party or parties than the user in the environment of the input device. Thus, there is less need to segment single signals into parts carrying information originating from different respective users. This reduces the effort required to make the method responsive enough for real-time or near real-time control of a system. A further advantage is that, in such telecommunications systems, all interactions are of the conversation-like type. They need only be distinguished from noise in case of open connections not currently in use.

In an embodiment, wherein the telecommunication system interfaces with a number of input devices for obtaining a signal representative of information communicated by the user and with a number of reproduction devices for reproducing the signal from the first source in perceptible form, the system is caused to time the performance of a function for locating the user in relation to the estimated time.

An effect is to allow the user to move around without the need permanently to track the user. Only when the user is expected to communicate using the telephone system will his location be determined, since he or she can then be expected to be near one of the input devices. Thus, the location method can be tied to only the input devices, and need not be ubiquitous.

In a variant of this embodiment, the user is caused to be located at least partly on the basis of signals from the input devices during an interval in which it is estimated that information is communicated by the user.

This variant can be based predominantly or only on the known locations of the input devices. In the case of audio information, for example, the relative strengths of the signals from multiple input devices can be determined. Because this is done during intervals in which information is expected to be communicated by one particular user, the method is more accurate (or conversely, it can be less sophisticated and yield results of the same accuracy as a more sophisticated location method). During other intervals, there may be only background noise, or indeed signals carrying information communicated by other users in the same environment.

An embodiment of the method includes delaying a function of rendering an output on a device in the environment of the user until the time determined in relation to the estimated time.

Thus, in a multi-media environment, the user is not disturbed by other types of information not related to the conversation-like interaction he or she is engaged in. Such interruptions are timed to occur at the most appropriate moment. For instance, indications that e-mail has arrived can be delayed until a user has stopped speaking, more precisely is expected to have stopped speaking.

An embodiment of the method includes causing the system to perform a function at a time determined in relation to the estimated time only if no information is communicated from at least one of the first source and the user within an interval following the point in time when the transition is expected to occur.

Thus, the method quickly detects the end of a conversation-like interaction, and can then proceed to have a system in the user's environment perform delayed functions. This increases the effectiveness with which the system is used by the user.

An embodiment of the method includes, prior to estimating at least a point in time when a transition between information flowing from the first source and information flowing from the user is expected to occur, analyzing the flow of information carried in the signal from the first source and at least one flow of information carried in a signal from one of the input devices over time using at least one criterion for detecting interaction of a type corresponding to conversational turn-taking between a user in an environment of the input devices and the first source.

This embodiment can, amongst others, be used to distinguish between multiple conversation-like interactions, which are each detected first. Subsequently, the structure of each individual one of these interactions can be analyzed to time the performance of system functions. Especially in combination with location methods to locate each of multiple users in the same environment, the method is responsive to each user individually and increases the effectiveness with which the individual users can use the system or systems in their shared environment (e.g. the home or the office).

According to another aspect, the signal processing system according to the invention includes:

an interface to at least one input device in an environment of a user in which a signal from a first source is available in perceptible form, the interface for obtaining at least one signal representative of information communicated by the user; and a processing arrangement for estimating at least a point in time when a transition between information flowing from the first source and information flowing from the user is expected to occur, wherein the signal processing system is arranged to time the performance of a function of a system in relation to the estimated time.

In an embodiment, the signal processing system is configured to carry out a method according to the invention.

According to another aspect, the computer program according to the invention includes a set of instructions capable, when incorporated in a machine-readable medium, of causing a system having information processing capabilities to perform a method according to the invention.

DETAILED DESCRIPTION OF THE DRAWINGS

The invention will be explained in further detail with reference to the accompanying drawings, in which.

Figure 6:
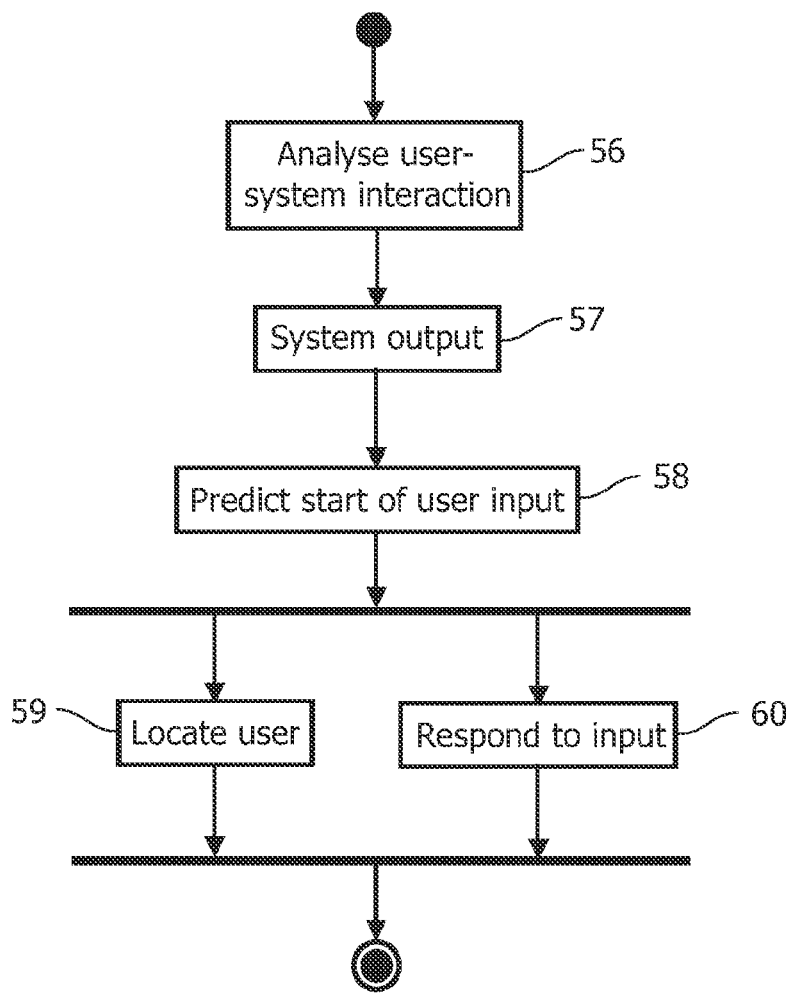
Figure 5:
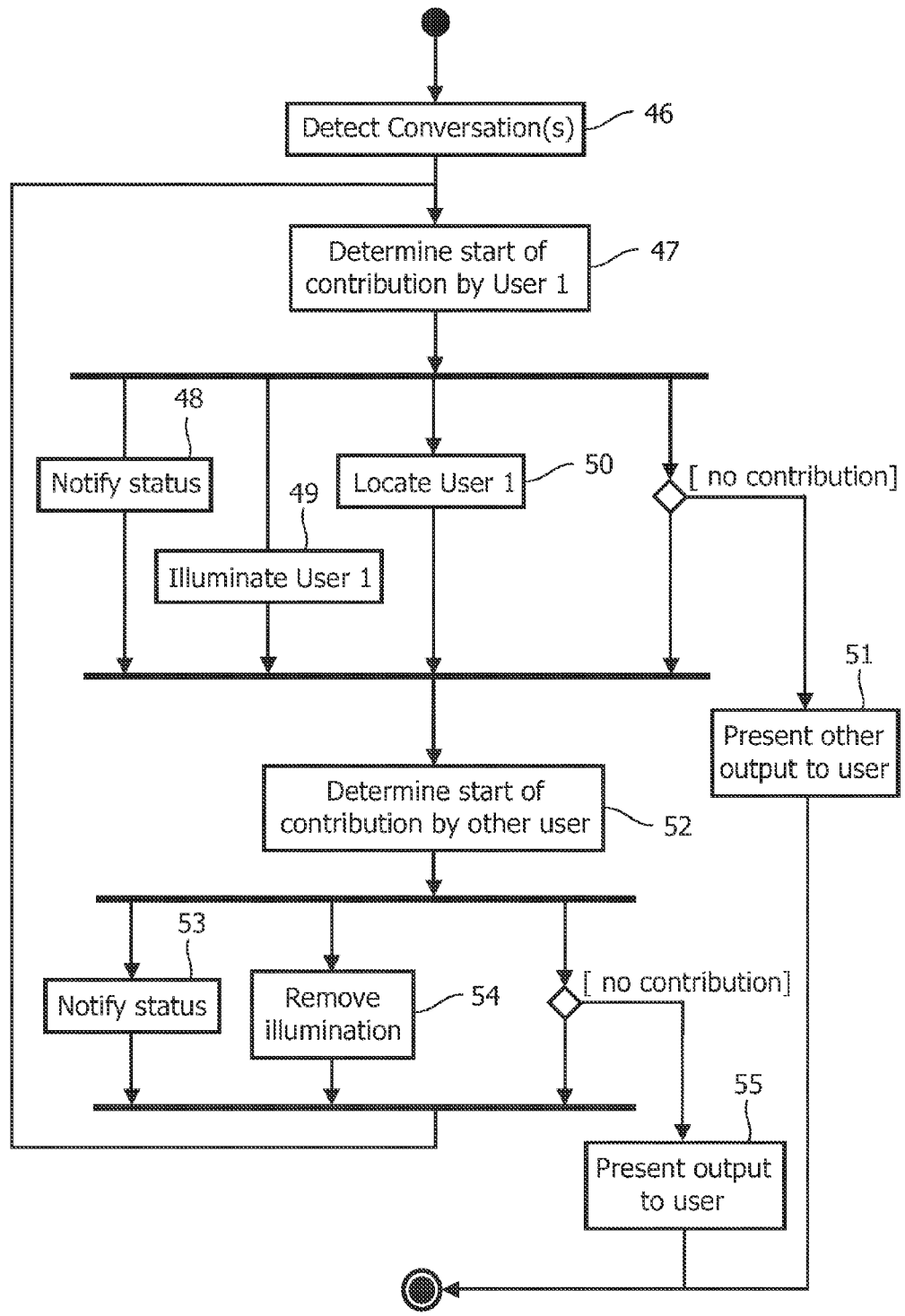

FIG. 5 is a flow chart illustrating a method of controlling the execution of a method of locating a user using the ambient telephone system on the basis of information communicated between the user and a user of a remote telecommunications terminal; and FIG. 6 is a flow chart illustrating a method of controlling the execution of a method of locating a user using the ambient telephone system on the basis of information communicated between the user and a data processing system with an audio user interface.

DETAILED DESCRIPTION

Figure 1:
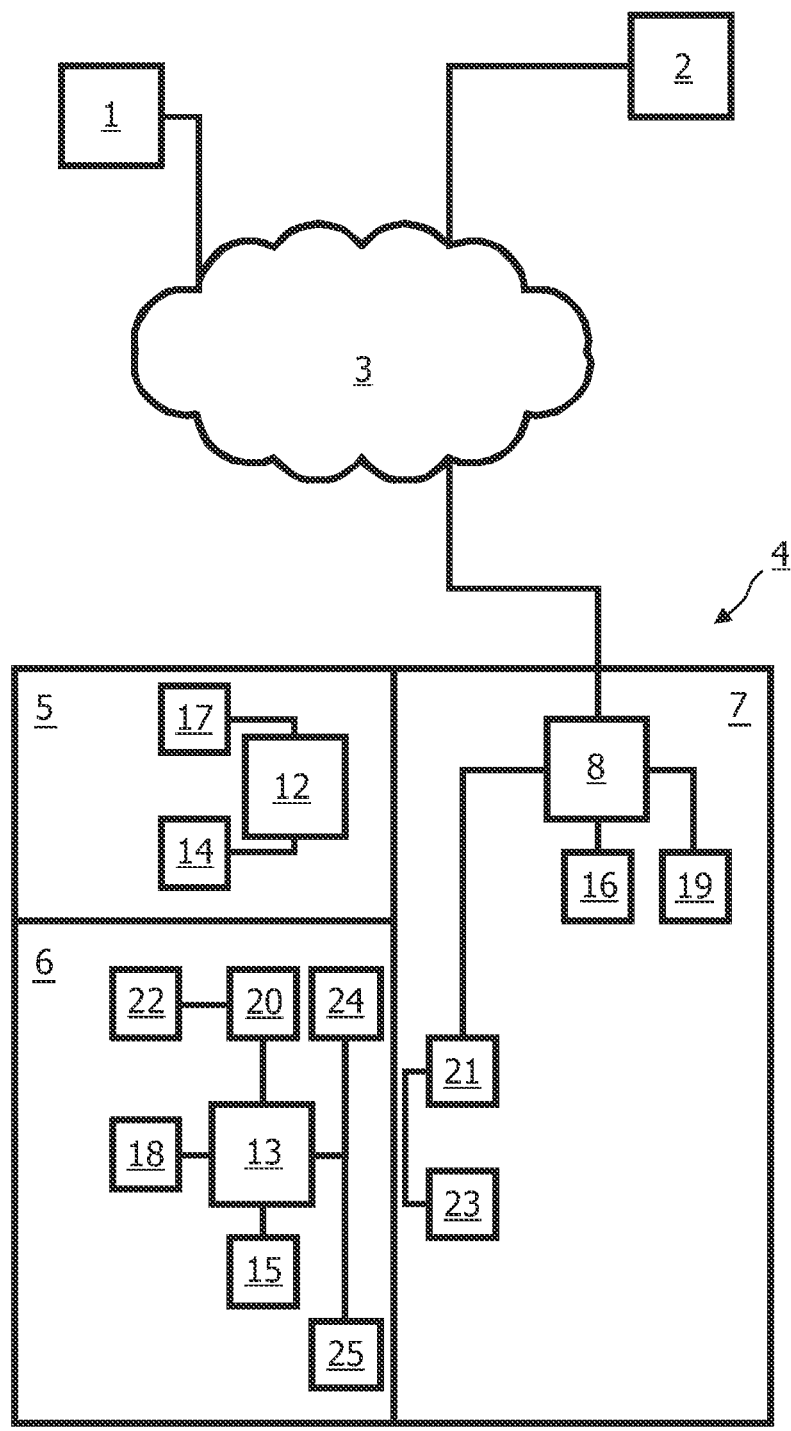
FIG. 1 illustrates schematically an ambient telephone system in a communications network including two remote terminals.

By way of example, two remote terminals 1, 2 connected to a telecommunications network 3 are shown in FIG. 1. A building 4 with three spaces 5-7 forms a local environment with at least one connection to the network 3.

The network 3 is a wide area network, and may include cellular telephone networks, POTS networks or broadband internet networks, for example. Communication may be via direct connection, but is preferably data packet-based. In the following, it will be assumed that communication is voice-based with optional video images, such as is the case for videoconferencing applications. The same principles also find application in other methods of information communication between individuals, including text messaging, posting messages on bulletin boards, etc. In those other example, as in this example, information communicated from the remote terminal(s) 1, 2 and from real or virtual local terminals in the building 4 is analyzed over time based on a model of interaction of a type corresponding to conversational turn-taking between users of the respective terminals. The structure of conversation-like interactions that are determined to be in progress is used to control the execution of system functions and, optionally, the execution of functions of other devices in the building 4. Information regarding the structure of detected conversations is also used to control audio rendering and capture by the ambient telephony system.

Network connectivity is increasingly based on flat-rate subscription models where call minutes do not count. Therefore, it is common to have very long calls or calls that are no longer either open or closed, but partially open in many different ways. Consequently, there will be many situations in which there are connections open to several remote terminals 1, 2, without the connection being used by users to communicate information. For example, a user may be signed in to a peer-to-peer overlay network, without even being near his computer.

In the illustrated embodiment, the ambient telephone system is constructed of individual networked phone units, preferably connected using a wireless network. However, the principles outlined herein also apply to systems in which multiple microphones and loudspeakers are connected to the same telephone system, e.g. a home intercom system or wired telephone system. The methods outlined herein are carried out by the ambient telephone system in this example, so that a distinction will be made between callers and users, callers being used to refer to users of remote terminals 1, 2 and user being used to refer to individuals within the building 4.

Figure 2:
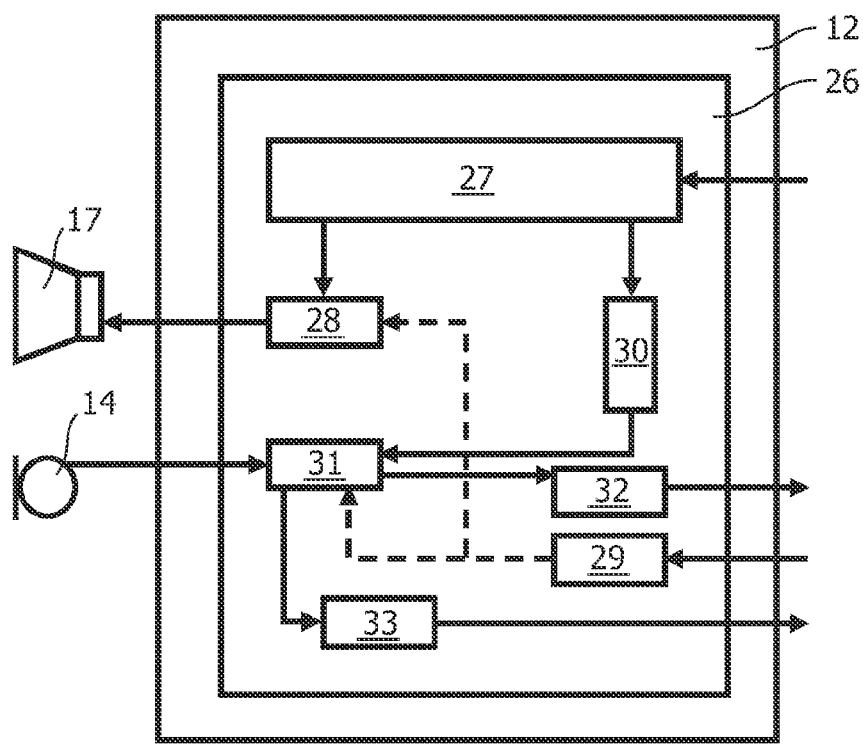
FIG. 2 illustrates schematically functional components of an individual phone device in the ambient telephone system.
Figure 3:
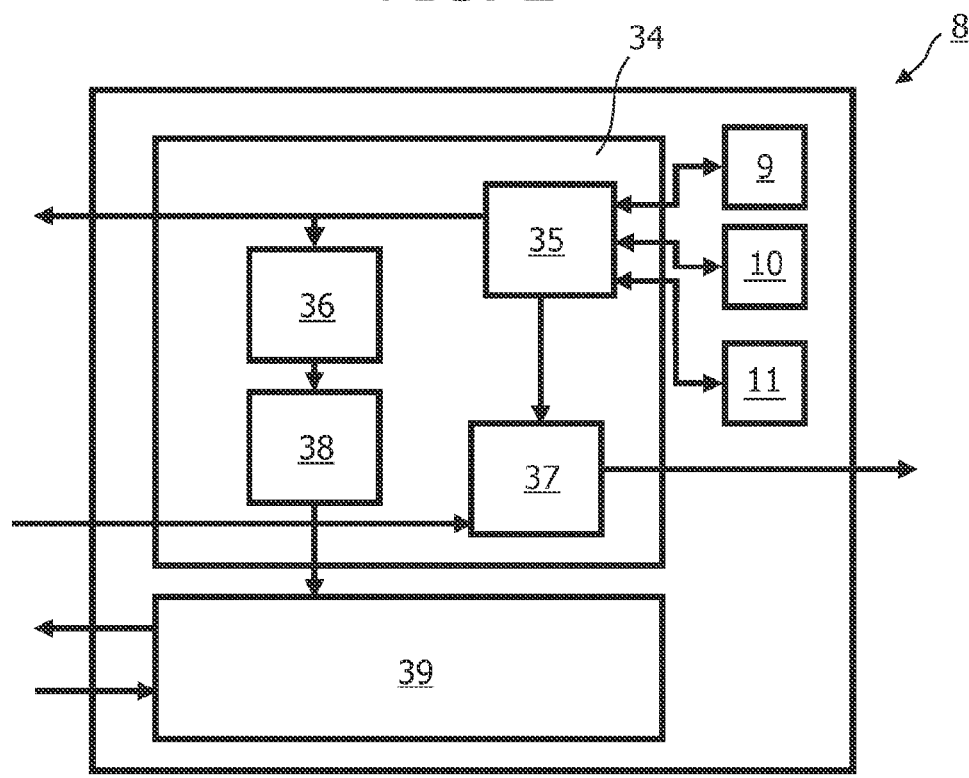
FIG. 3 illustrates schematically functional components of a master or proxy phone in the ambient telephone system.

A master phone unit 8 includes an interface to the telecommunications network 3, and is illustrated individually in FIG. 3. In the illustrated example, there are interfaces 9-11 to the Internet, a Plain Old Telephone System and to a cellular telephone network. Fewer and other types of interface may be used in alternative embodiments. The master phone unit 8 could also be regarded as a proxy phone unit, in the sense that other individual phone units 12, 13 communicate with the remote terminals 1, 2 via it. A first of the individual phone units 12 is illustrated in detail in FIG. 2, the others being identical. The master phone unit 8 comprises an individual phone unit in the ambient telephone system illustrated in FIG. 1.

Each individual phone unit 12, 13 and the master phone unit 8 interfaces with at least one microphone 14-16, and at least one speaker 17-19. In the illustrated embodiment, the second individual phone unit 13 and the individual phone unit comprised in the master phone unit 8 also interface with respective cameras 20, 21 and display devices 22, 23. Output signals can be provided from the second individual phone unit 13 to an external illumination device 24 and an entertainment device 25, such as a radio or television set. One or more of these connections may be via a wireless network also, or some network for home automation.

Referring to FIG. 2, a separate caller unit 26 is provided for each connection to a remote caller handled by the individual phone unit 12. An interface 27 includes a decoder and input buffer. In the illustrated example, the interface 27 comprises an RTP (Real-time Packet protocol) socket interface including a G.722 decoder and input buffer. It receives RTP data from an IP (Internet Protocol) socket (not shown).

A rendering unit 28 enables the decoded audio data to be rendered by the speaker 17. It operates at least partly under the control of a control unit 29, which also implements a geometric model, and in turn receives control signals in the form of messages, e.g. according to the SIP (Session Initiation Protocol) protocol and carried as TCP (Transmission Control Protocol) over IP packets, from the master phone unit 8. A delay line 30 is provided for providing a reference signal to an input signal processing unit 31. The reference signal enables the input signal processing unit 31 to perform acoustic echo cancellation. The input signal processing unit 31 also performs automatic gain control, and may perform other signal processing functions to provide a signal carrying audio information from a user. The input signal processing unit 31 also receives control signals from the control unit 29. The input signal processing unit provides a signal carrying audio information to a G.722 decoder and output RTP socket 32 and to a speech activity detection (SAD) system 33.

A typical SAD system 33 uses an algorithm that computes a number of characteristic features from a short audio segment and uses these to determine if the sound segment is speech, non-speech or silence. Any type of speech activity detection (also known as voice activity detection) algorithm can be implemented.

Examples are given in:

Bhou-Gazale, S. and Assaleh, K., "A robust endpoint detection of speech for noisy environments with application to automatic speech recognition", *Proc. ICASSP* 2002, Orlando, Fla., May 2002;

Davis, A. et al., "Statistical voice activity detection using low/variance spectrum estimation and an adaptive threshold", *IEEE Trans. on audio, speech and language processing*, 14(2), 2006, pp. 412-424; and Huang, L, and Yang, C., "A novel approach to robust speech detection in car environments", *IEEE Int. Conf on Acoustics, Speech and Signal Processing*, 3(5-9), 2000, pp. 1751-1754.

It is observed that the functionality of the SAD system 33 can also be implemented only in the master phone unit 8, which receives the signal provided via the G.722 decoder and output RTP socket 32. This functionality can also be implemented as part of the echo cancellation and speech enhancement algorithm implemented in the input signal processing unit 31. The output of the speech activity detection is often a binary value. It can also be a confidence value, for example. The result of the speech activity detection for intervals of pre-determined duration is sent over the network in the building 4 to the master phone unit 8.

Referring to FIG. 3, the master phone unit 8 creates a call instance 34 for each external caller (corresponding to a remote terminal 1, 2 in this case) to which a connection is open. The call instance 34 makes use of a speech enhancement function 35 to provide a signal carrying audio information that is transmitted to one or more of the individual phone units 12,13. This signal is also subjected to speech activity detection 36. Both the output of the speech enhancement function 35 and other signals carrying audio information and associated with the call instance 34 are submitted to residual AEC 37, before being output, in particular to one or more of the speakers 17-19.

A conversational activity detection unit 38 receives the outputs from both the SAD system 33 in the first individual phone unit 12 and similar systems in the other individual phone units and from the speech activity detection function 36 applied to the information communicated from the remote terminal 1,2 with which the call instance 34 is associated. The outputs of the conversational activity detection unit 38 are values representing temporal probabilities of the presence of a conversation-like interaction between a caller using the associated remote terminal 1, 2 and a local user in an environment including one or more of the individual phone units 12, 13. These outputs are provided to a master control unit 39 for controlling the ambient telephony systems itself or a device external to it, such as the entertainment device 25 or the external illumination device 24, etc., as will be explained.

Figure 4:
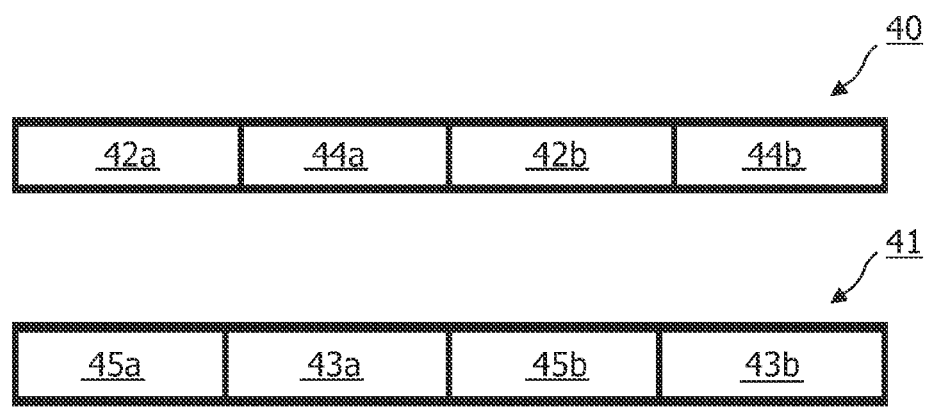
FIG. 4 illustrates schematically the speech activity in two channels representing speech signals from two users who are in active conversation.

Referring to FIG. 4, a model of conversational turn-taking is illustrated. The model is used to control the ambient telephone system and, optionally, other devices. FIG. 4 shows two flows 40, 41 of audio information, one from one of the remote terminals 1, 2 and the other from a user of one of the individual phone units 12, 13 or the master phone unit 8. The latter flow 41 may in fact be obtained by segmenting an audio signal into segments associated with one of several users providing audio information to one of the phone units 8, 12, 13 using a segmentation technique such as described in WO 2007/086042, for example. The flows 40, 41 comprise periods 42, 43 of silence and periods 44, 45 of speech as determined by the SAD system 33 and SAD function 36.

Referring to FIG. 5, the control of ambient telephone system functionality includes a step 46 of detecting the ongoing conversations. In the illustrated embodiment, this detection involves analyzing the flow of audio information carried in a signal from one of the remote terminals 1, 2 and the flow of audio information in an audio input signal to one of the phone units 8, 12, 13 using at least one criterion for detecting interaction of a type corresponding to conversational turn-taking between a user in the building 4 and a user of the remote terminal 1, 2 concerned. In alternative embodiments, this step 46 may be replaced by a step of determining the conversations in existence on the basis of prior user input, e.g. to establish a connection to a remote terminal 1, 2. That is to say that the existence of a conversation is hypothesized based on the fact that a user has requested a connection to be established and/or on the fact that such a connection is in fact currently open. In a system in which connection can be open for prolonged periods of time without being in active use, the step 46 of detecting conversations increases efficiency of use of resources, however.

The detection of a type of interaction corresponding to conversational turn-taking is based on a number of principles:
1. In a conversation, only one talker is active at any one time for the majority of the conversation;
2. Talkers take turns, such that the channels of the active/silent talker alternate;
3. Continuous silence in both channels means that there is no active conversational turn-taking between participants;
4. Non-alternating speech activity in one channel means that there is no conversational activity between channels, but e.g. a conversation between two callers picked up by the same remote terminal 1, 2.
5. If the turn-taking between periods 44, 45 of speech and periods 42, 43 of silence are not synchronized between channels, there is no conversational turn-taking between the channels in question. That is why the flows 40, 41 are analyzed over time in relation to each other.

A possible algorithm for detecting conversational turn-taking is the following:

Let n be the audio frame index and pl(n) be the likelihood that frame n in channel/contains speech as determined by the SAD system 33 or SAD function 36. In a simple example, the value of pl(n) can be 0 (no speech) or 1 (speech). There are four state variables that are initialized to zero, Presence1, Presence2, Conflict, Silence. There are three further state variables that are initialized as follows:
g1=0.9;
g2=0.99; and
g3=0.995.

In pseudo-code, the algorithm runs as follows:

```
1.    Determine the VAD status of the current frame n in
      channels 1 and 2 and evaluate:
      if p1(n)>0 AND p2(n)==0,
      Presence1 := g1*Presence1+(1-g1);
      Presence2 := g2*Presence2;
      Conflict := g2*Conflict:
      Silence := g3*Silence:
      end
      if p2(n)>0 AND p1(n)==0,
      Presence2 := g1*Presence2+(1-g1);
      Presence1 := g2* Presence1;
      Conflict := g2*Conflict;
      Silence := g3*Silence;
      end
      if p2(n)>0 AND p1(n)>0,
      Presence1 := g2*Presence1+(1-g2);
      Presence2 := g2*Presence2+(1-g2);
      Conflict := g1*Conflict+(1-g1);
      Silence := g3*Silence;
      end
      if p2(n)==0 AND p1(n)==0,
      Presence1 := g3*Presence1;
      Presence2 := g3*Presence2;
      Conflict := g3*Conflict;
      Silence := g3*Silence+(1-g3);
      end
Conversation(n)=Presence1+Presence2-Conflict-Silence;
2.    n:=n+1 go to step 1.
```

The conversation is detected when the current value of Conversation(n) exceeds a certain threshold value. Thus, the algorithm evaluates information over time, because it is backward-looking, the state variables ensuring that the current value of Conversation is based on evaluation of preceding audio frames. At the same time, because it is a continuously evolving determination of whether a conversation exists, it is suitable as the basis for an output signal for controlling a device.

The basic method outlined above can be enhanced in various ways, depending on the available computational resources, amongst others. For example, in addition or as an alternative to the state variables Presence1, Presence2, Conflict, Silence, state variables computed over longer periods of observation (several audio frames) can be used. These include correlation or mutual information metrics computed over several minutes of speech activity detection values in two or more signals.

In a natural conversation, the listening participant often provides feedback to the talker in the form of short utterances ("Yes", "O.K.", "Really?", "Hmm.", etc.). This is often called backchannel speech activity. It can be detected separately within the flows 40,41 of audio information from one of the remote terminals 1,2 and from a user of one of the individual phone units 12,13 or the master phone unit 8, based on the fact that these utterances are short (<1 s.) and are separated by relatively long silences. The backchannel activity detection can be used as an additional state variable, or it can be used to modify e.g. the state variable Conflict, in that conflict is only detected when a time segment of overlapping speech activity does not represent backchannel activity from the other talker.

A further feature can be derived from the temporal fine-structure of turn-taking. For example, the time difference between the point in time between the end of a period 45 of speech activity in the second flow 41 of audio information and the start of a subsequent period 44 of speech activity in the first flow 40 of audio information and vice versa can be used as a measure of the quality of the conversational turn-taking. In the case of a conversation-like interaction, this time difference measured over several changes of speaker has a slightly positive mean value and low variance compared to non-conversational interaction. In the latter case, the time difference has a mean value zero and large variance.

To improve the accuracy with which changes of speaker are detected, speech activity detection can be augmented with an analysis of the contents of the audio information. In particular, for the flows 40,41 of audio information, the pitch can be analyzed. In many languages, a rising pitch before the end of a spoken utterance indicates a question to the other talker. If this is followed by the speech activity of the other, possibly after a small pause, this type of change can be labeled a Question-Answer structure, which can be characterized as a feature (state variable) in the conversation model used to detect conversation-like interactions.

It is observed that the algorithm described above in detail is based on the dynamic temporal evolution of a number of state variables determined using first-order integrators. Various different linear and non-linear filtering and integration algorithms can be used as an alternative.

Instead of using a linear combination of features to form a feature Conversation representing the likelihood of conversational activity, detection of a conversation can be based on other models than linear detection (or regression) models, including various types of data classification methods based on discriminant analysis, support vector machines and neural networks.

The feature Conversation can also be a continuous likelihood variable with values on a scale between 0 and 1, instead of being a binary variable.

Finally, instead of using fixed parameters for temporal evolution (g1, g2, g3) and detection logic (step 2), separate techniques can be used to optimize the parameters for different users and callers, or different contexts. For example, the conversation detector could be tuned separately for each pair of conversational partners of the system or each local user and identified regular remote caller. Similarly, the parameters and/or detection logic could differ depending on whether the signals communicating audio information that is being analyzed is from the first or second individual phone unit 12,13 or from the master phone unit 8.

Methods of conversation detection and analysis are generally quite difficult to implement in real-time. However, in a mediated environment such as a telecommunications system, their implementation becomes feasible at a lower computational cost, because it is already clear where each flow of audio information is coming from. This is in contrast to a system of conversation detection amongst persons in a room fitted with microphones, because there all the sound is captured, and must first be attributed to the various persons in the room.

Following the detection of a conversation involving e.g. User 1 in the local environment of the building 4 and a caller using e.g. the first remote terminal 1, the ambient telephone system analyses the first flow 40 of information, e.g. attributed to User 1, and the second flow 41 of audio information, e.g. attributed to the remote caller in relation to each other on the basis of a model of conversational turn-taking, so as to predict when the transition from a period of silence 42 to a period 44 of speech in the signal from the local user is expected to occur (step 47). This analysis can be based on only voice-activity detection to locate the periods 44,45 of speech and periods 42,43 of silence. It may be augmented by an analysis of the contents of at least parts of the flows 40,41 of audio information. In particular, the detection of a rising pitch preceding a silent period in the remote caller's voice, an indicator of an interrogative clause, can be used as an indicator that a period 45 of speech from the local user is about to follow.

Substantially at this time, or shortly thereafter, but at least within, and only within, a period 44 in which speech from User 1 is expected, several system functions are caused to be performed.

In one exemplary step 48, which step is optional, the status of User 1 is communicated to other systems, e.g. over the network 3. This can help avoid interruptions. In a video conferencing embodiment, the notification can be used to highlight the next speaker on the display device 22 and on that of the remote callers.

If User 1 is located in the space 6 in which the second individual phone unit 13 is located, then the illumination device 24 is controlled (step 49) to increase the level of illumination. Again, this would be useful in video conferencing applications.

It is also possible e.g. to increase the sensitivity of the microphones 14-16, decrease the volume of the speakers 17-19 and/or take similar measures to improve the quality of sound transmitted to remote callers. Such measures also make echo cancellation easier to carry out.

In any case, the predicted transition is used selectively to activate (step 50) a, preferably audio-based, location method. That is to say that the user is caused to be located at least partly on the basis of signals from the microphones 14-16 during an interval in which audio information is expected to be communicated from that local user. In particular, the expected start of the contribution by that particular user is distinguished from the start of a contribution by another local user to the same or a different conversation-like interaction. This contributes to an increase in accuracy of the location method. Distinguishing the start of a next contribution from the local user from the contribution from a remote caller means that less effort has to be expended on processing the input signals from the microphones 14-16 to remove background noise.

Any known type of audio-based location can be carried out in principle. In a simple embodiment, the user can be associated with the phone unit 8,12,13 receiving the strongest microphone signal. In another embodiment, triangulation can be used to provide a more exact location. It is observed, incidentally, that the tracking of the user's location need not exclusively consist of an audio-based method.

In the method of FIG. 5, if no information is communicated from User 1 within an interval following the point in time at which the transition to a period 44 of speech from the user is expected to occur, then one or more further system functions are caused to be carried out (step 51). In particular, this point in time is taken as a good point at which to interrupt the user. The effectuation of certain actions is thus delayed to such a point in time. Examples of actions triggered in this step 51 include introducing another caller who has requested to join a conference call into the ongoing conversation or rendering a message or other output completely unrelated to the conversation. For example, the system may cause a data processing system to delay the provision of an indication that a call, a text message, an e-mail or an image has been received through another communication device (not shown in FIG. 1). As another example, error messages or attention messages from devices in the building 4 including the phone units 8,12,13 may be delayed until this step 51 is triggered.

In the illustrated embodiment, the ambient telephone system also predicts (step 52) at least a point in time when a transition to a period 45 of speech from the remote caller is expected to occur.

It then communicates (step 53) the change in status of the local user to other systems, e.g. over the network 3 in a step similar to the preceding step 48 of the same name.

If the user is located in the space 6 in which the second individual phone unit 13 is located, then the illumination device 24 is controlled (step 54) to decrease the level of illumination. This step 54 is generally representative of all manner of similar steps of controlling devices external to the ambient telephone system, where adaptation of the performance of a function of such external device is caused to be initiated at a time determined in relation to the predicted time of transition between contributions from one participant in a mediated conversation to another.

Again, if no information is communicated from the external caller within an interval following the point in time at which the transition to a period 44 of speech from the remote caller is expected to occur, then one or more further system functions are caused to be carried out (step 55).

FIG. 5 gives an example of a conversation-like interaction in a telecommunication system, where the interaction is indeed between two or more persons. The same principle can be applied to any distributed speech interface system, e.g. those used in home support and comfort applications, elderly care applications and spoken dialogue systems. In that case, at least one of the flows of information is from a non-human source. Thus, where the phone units 8,12,13 are provided with a distributed speech interface system and means for controlling devices in the building 4 such as the entertainment device 25, a method as illustrated in FIG. 6 can be carried out.

In a first step 56, the flows of information from the user to the system and the system to the user are analyzed to determine whether a conversation-like interaction is taking place. The system provides output (step 57), e.g. audible output in the form of an invitation to the user to provide spoken input. A prediction is then made as to when the user is likely to commence providing spoken input (step 58). At a point in time determined in relation to this predicted point in time (e.g. exactly the same point in time or some point in time slightly afterwards), the performance of an audio-based location method is initiated (step 59). Additionally, the system is triggered (step 60) to apply automatic speech recognition to only the audio information received within an interval determined in relation to the point in time predicted in the preceding step 58. An effect is that the system need not analyze all sound input picked up by the microphones 14-16.

Thus, the performance of a function by the system is initiated at a time determined in relation to a point in time predicted on the basis of knowledge of the structure of a conversation-like interaction. In particular the accuracy with which a user is located in a system of distributed speech transducers is improved.

It should be noted that the above-mentioned embodiments illustrate, rather than limit, the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

Although a conversation-like interaction between a user and a single remote caller or local data processing system has been used as an example, the methods outlined herein are equally useful in conversations involving turn-taking between three or more participants. Pattern detection can be used to predict which of the three will follow another of the three in the interaction. Alternatively, merely the point in time at which a transition to another speaker is expected to occur can be predicted. The performance of the function at a time determined in relation to the predicted time may then be made dependent on the fulfillment of a further condition, e.g. that the next voice activity detected must be local, or that the previous speaker must not have been a local user.

In the examples, an initiation of a performance of a function corresponds to a triggering of the performance of the function. It may also correspond, for example, to the initiation of an execution of an audio-based location method with a different weighting. In that case, the locations determined using audio frames coinciding with expected speech intervals are given more weight than locations determined using other audio frames. Thus, the method of FIG. 5 can be modified such that the step 50 of locating a user is carried out continuously, but that the estimated locations are weighted depending on the likelihood that they were estimated using audio information obtained during a period 45 of speech or a period 43 of silence from the local user.

The invention claimed is:

1. A method of controlling a system, including:
obtaining at least one signal representative of information communicated by a user via an input device in an environment of the user, wherein a signal from a first source is available in a perceptible form in the environment;
predicting, by a processor, at least a next point in time when a transition between information flowing from the first source and information flowing from the user is expected to occur; and
timing the performance of a function by the system in relation to the predicted time, said performance being adjusted to improve said information flowing from said user after said transition.

2. The method according to claim 1, including:
obtaining the signal from the first source and
carrying out the prediction by analyzing the flow of information from the user and the flow of information carried in the signal from the first source in relation to each other on the basis of a model of conversational turn-taking.

3. The method according to claim 2, wherein the analysis of the flows of information includes applying a voice activity algorithm to the at least one signal representative of information communicated by the user.

4. The method according to claim 1, wherein the signals from the at least one input device and from the first source include at least an audio component, and wherein the method includes analyzing flows of audio information over time in relation to each other.

5. The method according to claim 1, wherein the signal from the first source is obtained via at least one telecommunications network from a remote telecommunication terminal having an open connection to a telecommunications system including an interface to at least the input devices in the environment of the user.

6. The method according to claim 5, wherein the telecommunication system interfaces with a number of input devices for obtaining a signal representative of information communicated by the user and with a number of reproduction devices for reproducing the signal from the first source in perceptible form, wherein the system is caused to time the performance of a function for locating the user in relation to the predicted time.

7. The method according to claim 6, wherein the user is caused to be located at least partly on the basis of signals from the input devices during an interval in which it is predicted that information is communicated by the user.

8. The method according to claim 1, including delaying a function of rendering an output on a device in the environment of the user until a time determined in relation to the predicted time.

9. The method according to claim 1, including causing the system to perform a function at a time determined in relation to the predicted time only if no information is communicated from at least one of the first source and the user within an interval following the point in time when the transition is expected to occur.

10. The method according to claim 1, including,
prior to predicting at least a next point in time when a transition between information flowing from the first source and information flowing from the user is expected to occur,
analyzing the flow of information carried in the signal from the first source and at least one flow of information carried in a signal from one of a plurality of input devices over time using at least one criterion for detecting interaction of a type corresponding to conversational turn-taking between a user in an environment of the plurality of input devices and the first source.

11. A signal processing system, including:
an interface to at least one input device in an environment of a user in which a signal from a first source is available in perceptible form, the interface for obtaining at least one signal representative of information communicated by the user; and
a processing arrangement for predicting at least a next point in time when a transition between information flowing from the first source and information flowing from the user is expected to occur,
wherein the signal processing system is arranged to time the performance of a function of a system in relation to the predicted time, said performance being adjusted to improve said information flowing from said user after said transition.

12. The signal processing system comprising a computer configured to carry out a method of:
obtaining at least one signal representative of information communicated by a user via an input device in an environment of the user, wherein a signal from a first source is available in a perceptible form in the environment;
predicting at least a next point in time when a transition between information flowing from the first source and information flowing from the user is expected to occur; and
timing the performance of a function by the system in relation to the predicted time, said performance being adjusted to improve said information flowing from said user after said transition.

13. A computer program including a set of instructions stored on a non-transitory, machine-readable medium capable of, when executed by a processor, causing a system having information processing capabilities to perform a method comprising:
obtaining at least one signal representative of information communicated by a user via an input device in an environment of the user, wherein a signal from a first source is available in a perceptible form in the environment;
predicting, by the processor, at least a next point in time when a transition between information flowing from the first source and information flowing from the user is expected to occur; and
timing the performance of a function by the system in relation to the predicted time, said performance being adjusted to improve said information flowing from said user after said transition.

* * * * *